United States Patent
Berggren et al.

(10) Patent No.: US 11,909,222 B2
(45) Date of Patent: Feb. 20, 2024

(54) DEVICE FOR A WIRELESS POWER TRANSFER SYSTEM

(71) Applicant: Ningbo Geely Automobile Research & Development Co., Ltd., Ningbo (CN)

(72) Inventors: Alexander Berggren, Gothenburg (SE); Gabriel Samuelsson, Alingsås (SE)

(73) Assignee: Ningbo Geely Automobile Rese arch & Dev. Co., Ltd., Ningbo (CN)

( * ) Notice: Subject to any disclaimer, the term of this patent is extended or adjusted under 35 U.S.C. 154(b) by 543 days.

(21) Appl. No.: 17/194,215

(22) Filed: Mar. 6, 2021

(65) Prior Publication Data

US 2021/0194283 A1 Jun. 24, 2021

Related U.S. Application Data

(63) Continuation of application No. PCT/CN2019/103603, filed on Aug. 30, 2019.

(30) Foreign Application Priority Data

Sep. 12, 2018 (EP) .................................... 18194133

(51) Int. Cl.
*H02J 50/10* (2016.01)
*H02J 50/70* (2016.01)
(Continued)

(52) U.S. Cl.
CPC ............ *H02J 50/10* (2016.02); *B60L 53/122* (2019.02); *H01F 38/14* (2013.01); *H02J 7/02* (2013.01); *H02J 50/70* (2016.02)

(58) Field of Classification Search
CPC .... H02J 50/10; H02J 7/02; H02J 50/70; H02J 50/005; H02J 50/402; H02J 7/0042;
(Continued)

(56) References Cited

U.S. PATENT DOCUMENTS

2012/0248883 A1* 10/2012 Konanur ................. H01F 21/12
307/104
2017/0040105 A1* 2/2017 Peralta .................... H01F 38/14
(Continued)

FOREIGN PATENT DOCUMENTS

| CN | 202923500 U | 5/2013 |
|---|---|---|
| CN | 106314187 A | 1/2017 |
| WO | 2017209968 A1 | 12/2017 |

OTHER PUBLICATIONS

Zhing, Wenxing, "Reconfigurable Wireless Power Transfer Systems with High Energy Efficiency Over Wide Load Range," IEEE Transactions on Power Electronics, vol. 33, No. 7., Jul. 2018, 12 pages.
(Continued)

*Primary Examiner* — Jared Fureman
*Assistant Examiner* — Michael J Warmflash
(74) *Attorney, Agent, or Firm* — Tucker Ellis LLP

(57) ABSTRACT

A device for a wireless power transfer system includes a housing and a conductor wire forming a coil arranged in the housing. The coil has a first topology. The conductor wire is rearrangeable such that the coil is given a second topology instead of the first topology. The first topology and the second topology are different from each other.

14 Claims, 7 Drawing Sheets

(51) Int. Cl.
 *B60L 53/122* (2019.01)
 *H01F 38/14* (2006.01)
 *H02J 7/02* (2016.01)
(58) Field of Classification Search
 CPC ...... B60L 53/122; B60L 53/126; H01F 38/14;
   H01F 29/12; Y02T 10/70; Y02T 10/7072;
   Y02T 90/14
 See application file for complete search history.

(56) References Cited

U.S. PATENT DOCUMENTS

2017/0353046 A1* 12/2017 Chen ..................... H02J 7/0044
2019/0326049 A1* 10/2019 Nishimura ................ H01F 5/02

OTHER PUBLICATIONS

Costantine, Joseph, et al., "Reconfigurable Antennas: Design and Applications," Proceedings of the IEEE, vol. 103, No. 3., Mar. 2015, 14 pages.
International Search Report from corresponding International Application No. PCT/CN2019/103603, dated Nov. 28, 2019, 2 pages.

* cited by examiner

DEVICE FOR A WIRELESS POWER TRANSFER SYSTEM

RELATED APPLICATION DATA

This application is a continuation of International Patent Application No. PCT/CN2019/103603, filed Aug. 30, 2019, which claims the benefit of European Patent Application No. 18194133.7, filed Sep. 12, 2018, the disclosures of which are incorporated herein by reference in their entireties.

TECHNICAL FIELD

The invention relates to a device for a wireless power transfer system, a transmitter and a wireless power transfer system comprising such a device for charging a vehicle.

BACKGROUND

Electric vehicles and plug in hybrid vehicles can be charged wirelessly through induction coils. Usually a first coil of a transmitter is arranged on the floor or the ground under the vehicle and a second coil of a receiver is arranged at the underside of the vehicle. There is a lot of different coil topologies that can be used for transferring power. In addition to transfer power efficiently, often small sized coils and coils enabling a large positioning tolerance between the transmitter coil and the receiver coil are preferred. This in turn makes the manufacturing and assembling of the coil into a casing relatively complicated. There are various coil topologies used at charging stations for vehicles. This means that the winding pattern of a receiver coil of a vehicle will not always match the winding pattern of a transmitter coil of a charging station. Further, vehicles have various ground clearances and distances between the receiver and the ground. Thus, in some cases it can be difficult to achieve efficient charging due to mismatch of topologies between the transmitter and the receiver.

SUMMARY

An objective of the invention is to provide a device for a wireless power transfer system, which device can be used for improving wireless charging of vehicles.

The objective is achieved by a device for a wireless power transfer system, wherein the device comprises a housing and a conductor wire forming a coil arranged in the housing, the coil has a first topology, and wherein the conductor wire is rearrangeable such that the coil is given a second topology instead of the first topology, and the first topology and the second topology are different from each other.

The invention is based on the insight that by such a device, the coil topology of a transmitter can be selected to match the coil topology of a receiver enabling efficient charging of a vehicle for various coil topologies of the receiver of the vehicle. By a first topology and a second topology different from each other is meant that the winding patterns of the coil and/or the levels (positions in a vertical direction) of the coil are different for the first topology and the second topology. Of course, the device can have two or more selectable coil topologies which are different from each other.

According to one embodiment of the device, the first topology has a plurality of coil windings arranged in a first pattern and the second topology has the plurality of coil windings arranged in a second pattern different from the first pattern. Hereby, the topology of a transmitter coil for charging vehicles can be changed from a first topology having a first standard pattern, to a second topology having a second standard pattern. Thus, the coil topology of the transmitter can be selected to match the coil topology of a receiver of the vehicle for efficient charging.

According to a further embodiment, the first topology has a plurality of coil windings arranged at a first level and the second topology has the plurality of coil windings arranged at a second level different from the first level. Hereby, the level of the transmitter coil can be selected for matching the dimensions and ground clearance of a vehicle to be charged. Thus, the distance between a transmitter coil and a receiver coil can be selected for efficient charging.

According to a further embodiment, the device comprises an actuator for moving the conductor wire from the first topology to the second topology, and from the second topology to the first topology. The actuator can be controlled by a control unit. By means of the actuator, the conductor wire can be moved in a rational way for providing various topologies.

For example, the actuator can comprise a motor, a spool driven by the motor and a non-conductive thread wound on the spool and mechanically connected to the conductor wire, and preferably the thread on the spool has a first end mechanically connected to a first end of the conductor wire and a second end mechanically connected to a second end of the conductor wire, wherein the first end of the thread is arranged to be wound up on the spool and the second end of the thread is arranged to be unwound from the spool, when the conductor wire is moved from the first topology to the second topology, and the first end of the thread is arranged to be unwound from the spool and the second end of the thread is arranged to be wound up on the spool, when the conductor wire is moved from the second topology to the first topology.

The actuator is preferably arranged for moving the conductor wire in the longitudinal direction of the conductor wire. Hereby, the conductor wire can be smoothly moved step by step along a predetermined path. The actuator is preferably arranged for pulling the conductor wire from the first topology to the second topology, and from the second topology to the first topology. Hereby, a conductor wire having a relatively high flexibility can be moved through a pipe or similar with low or no risk of getting stuck at bends of the pipe.

According to a further embodiment, the device comprises a first pipe portion for receiving and accommodating the conductor wire inside the first pipe portion, wherein the first pipe portion has a longitudinal extension forming a pattern that gives the conductor wire the first topology when being arranged inside the first pipe portion and/or the device comprises a second pipe portion for receiving and accommodating the conductor wire inside the second pipe portion, wherein the second pipe portion has a longitudinal extension forming a pattern that gives the conductor wire the second topology when being arranged inside the second pipe portion. Hereby, predetermined topologies can be achieved in a non-complicated way.

The actuator is preferably arranged for moving the conductor wire from the first pipe portion to the second pipe portion, and from the second pipe portion to the first pipe portion. For facilitating movement of the conductor wire, the device can have a lubricant arranged inside the pipe portion for reducing the friction between the conductor wire and the pipe portion and/or the device can have rolls arranged at the inside of the pipe portion for reducing the friction between the conductor wire and the pipe portion.

According to a further embodiment, the device has a first electric contact and a second electric contact, wherein a first end of the conductor wire is electrically connected to the first electric contact and a second end of the conductor wire is electrically connected to the second electric contact, when the coil has the first topology, and wherein the first end of the conductor wire is electrically connected to the second electric contact and the second end of the conductor wire is electrically connected to the first electric contact, when the coil has the second topology. Hereby, the number of requisite connectors and the amount of wire extending between the coil and a power supply equipment can be reduced, since only two electric contacts are required for two different topologies of the coil.

According to a further embodiment, the second electric contact has an opening through which the conductor wire extends, wherein the conductor wire is moveable relative to the second electric contact in two opposite direction. Hereby, it can be ensured that the current conductor wire end is positioned at the second electric contact for connection thereto after the conductor wire has been moved from the first coil topology to the second coil topology, or vice versa.

According to a further embodiment, at least one of the first topology and the second topology is arranged for wireless power transfer for charging a further apparatus or being charged by a further apparatus, and preferably both the first topology and the second topology are arranged for wireless power transfer for charging the further apparatus. The first topology can be a double-D (DD) coil topology and the second topology can be a circular square (CS) coil topology, or the first topology can be a circular square coil topology and the second topology can be a double-D coil topology.

Another aspect of the invention relates to a transmitter, and a further aspect of the invention relates to a wireless power transfer system for charging a vehicle. The advantages of the transmitter and the system are substantially the same as described for the device hereinabove.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
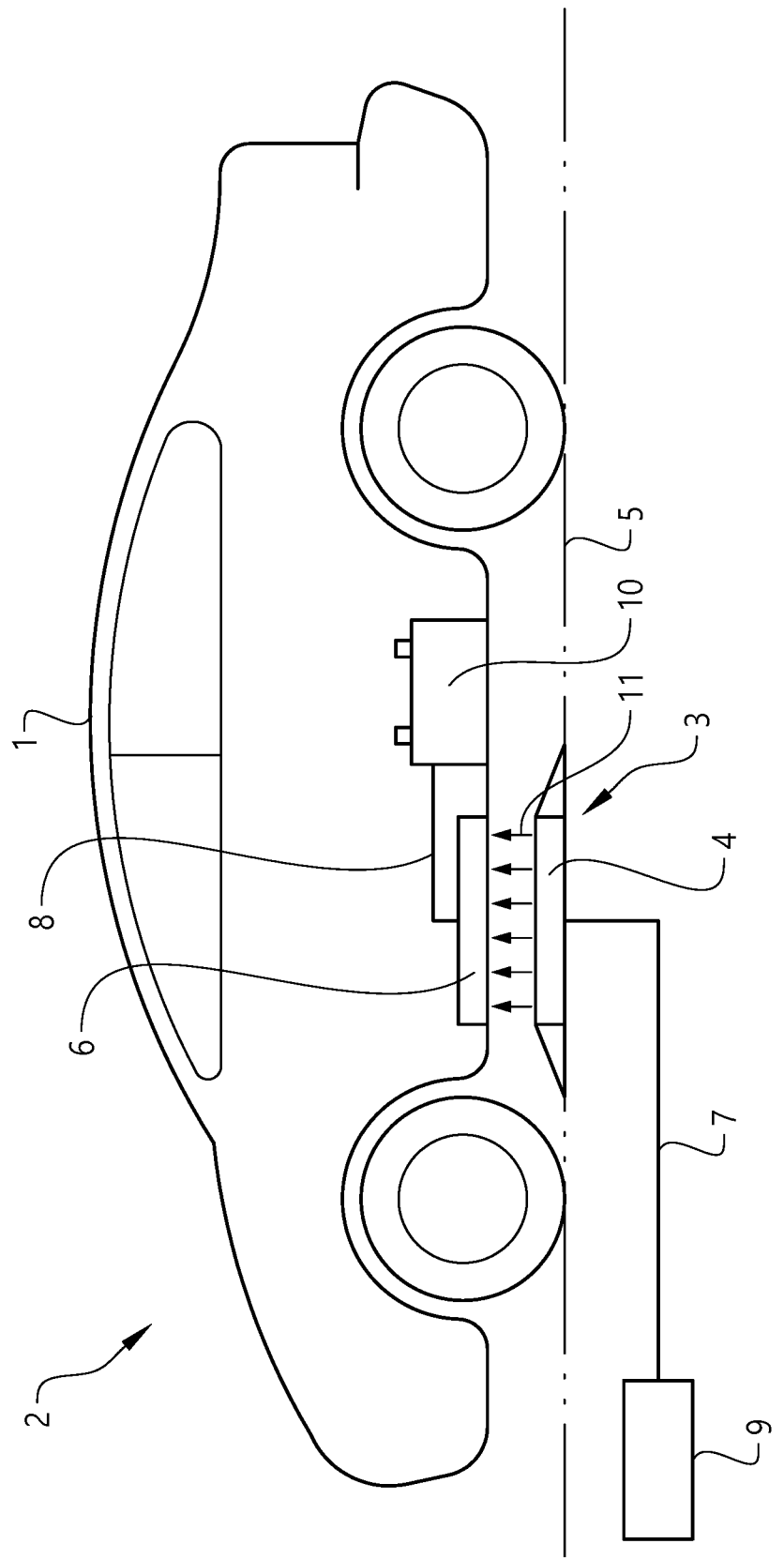
FIG. 1 is a schematic view showing a charging station and a vehicle.

In FIG. 1 a vehicle 1 is positioned at a charging station 2 where a wireless power transfer system 3 is used. The wireless power transfer system 3 includes a transmitter 4 for transferring power to a receiver 6 arranged in the vehicle 1. Such a transmitter can be arranged on or in the floor 5 or the ground. The receiver 6 is preferably arranged on the underside of the vehicle 1. The transmitter 4 has a primary coil for generating an electromagnetic field and the receiver 6 has a secondary coil for interacting with the generated electromagnetic field for achieving power transfer from the primary coil to the secondary coil by electromagnetic induction. An electric power input 7 to the transmitter 4 can be wirelessly transferred from the transmitter 4 to the receiver 6 to achieve an electric power output 8 from the receiver 6. The wireless transfer of energy is schematically illustrated with arrows 11.

In the illustrated example, the transmitter 4 is powered by a power source 9 electrically connected to the transmitter 4. The power source and the power outlet thereof can be arranged at any suitable position, for example the power source can be arranged on a wall. The receiver 6 can be connected to any arrangement for storing and/or consumption of the energy transferred. In the illustrated example, the receiver 6 is electrically connected to a battery 10 arranged on the vehicle 1 for charging the battery 10.

Before charging of the vehicle 1 is started, the vehicle is positioned for arranging the transmitter 4 and the receiver 6 relative to each other such that energy can be transferred from the transmitter 4 to the receiver 6. For optimizing the charging, the transmitter 4 and the receiver 6 are suitably arranged at a distance from each other in a vertical direction, which distance should be within a predetermined distance interval. Further, the transmitter 4 and the receiver 6 should suitably be aligned relative each other such that the transmitter and the receiver overlap each other within predetermined limits when looked at in the vertical direction.

The device according to the invention can be applied for providing a transmitter and/or a receiver of a wireless power transfer system. For example, such a wireless power transfer system device according to the invention can be used as a component of a transmitter to be arranged at a charging station as illustrated in FIG. 1. It should be stressed that when the device is used for a transmitter (or receiver), the complete transmitter (or receiver) may include other components as well, such as electric circuits and electric components. Further, the invention is not in any way limited to the car application. The device can be used in any vehicle or machine application, such as for charging for example cars, busses, trucks, industrial trucks and automated guided vehicles, construction equipment and work machines, and trains.

Figure 2A:
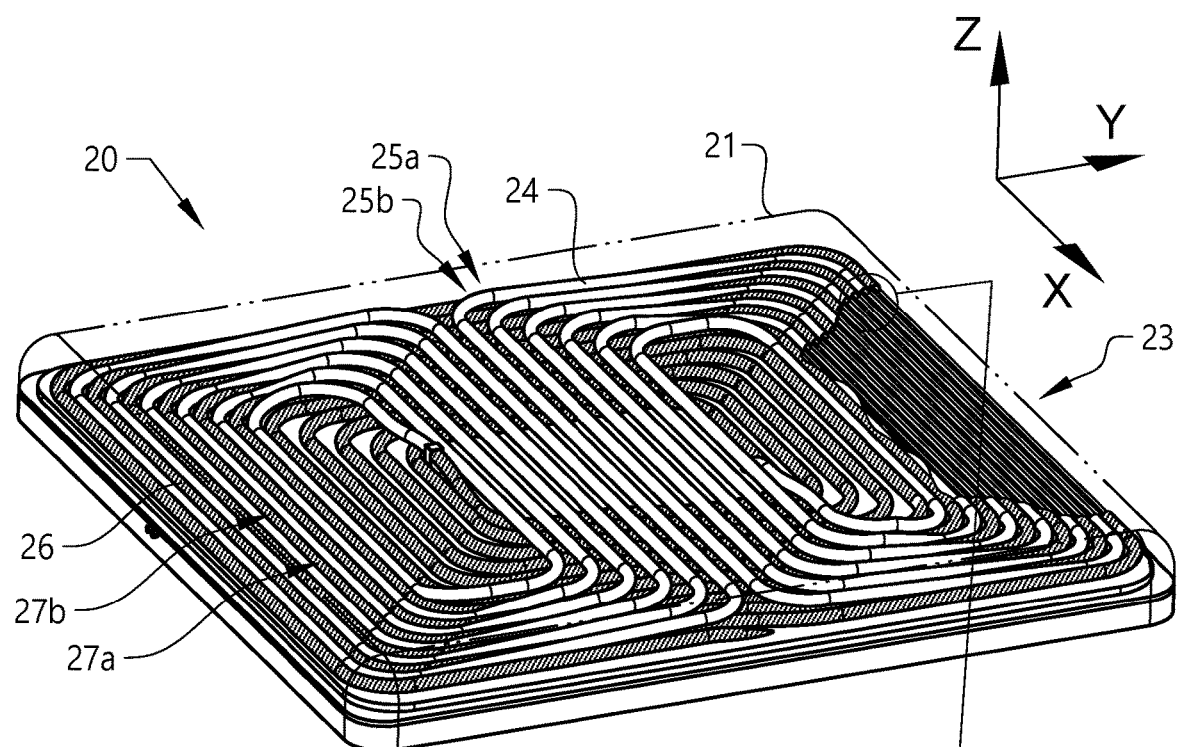
FIG. 2A is a perspective view of a device for a wireless power transfer system.

FIG. 2A shows a device 20 for a wireless power transfer system. The device comprises a housing 21 and a conductor wire 22 forming a coil 23 arranged in the housing 21. FIG. 2A is a partly cut perspective view where a part of the device has been removed for illustrating the coil 22. See also enlarged part in FIG. 2B. Further, the housing 21 is also depicted as transparent to show the components arranged inside the housing 21.

Figures 2B, 2C:
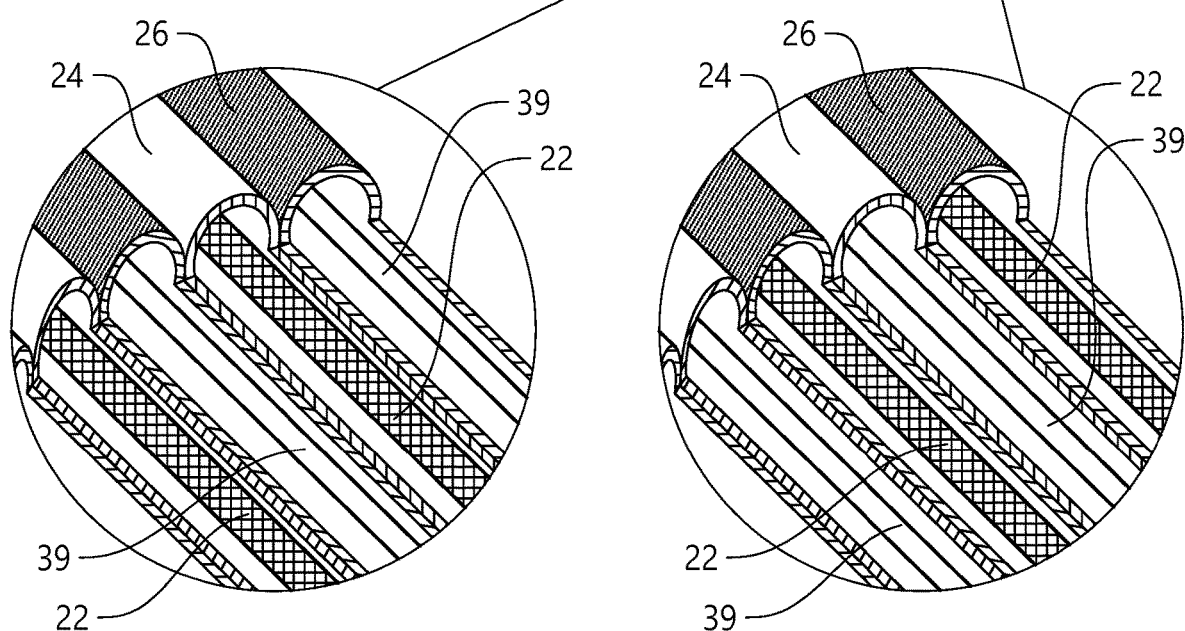
FIGS. 2B and 2C are enlarged views of a part of the device in FIG. 2A.

As illustrated in FIGS. 2A and 2B, the device 20 can comprise a first pipe portion 24 for receiving and accommodating the conductor wire 22 inside the first pipe portion 24. For illustration purposes only, the first pipe portion 24 is white. The coil 23 comprises a plurality of coil windings formed by the conductor wire 22. The coil 23 has a first topology 25a. This first topology 25a corresponds to the topology 25b of the first pipe portion 24. The first pipe portion 24 has a longitudinal extension forming a pattern that gives the conductor wire 22 the first topology 25a when being arranged inside the first pipe portion 24. Thus, the first pipe portion 24 forms a pattern corresponding to the winding pattern of the coil 23. The first pipe portion 24 can have a pattern corresponding to a topology of a coil used for charging vehicles, such as a DD coil topology.

Further, the device 20 can comprise a second pipe portion 26 for receiving and accommodating the conductor wire 22 inside the second pipe portion 26. In the enlarged part in FIG. 2C, the conductor wire 22 is shown when arranged in the second pipe portion 26 instead of the first pipe portion. For illustration purposes only, the second pipe portion 26 is grey.

The conductor wire 22 is rearrangeable such that the coil 23 is given a second topology 27a instead of the first topology. The first topology 25a and the second topology 27a are different from each other. By rearrangeable is meant that the conductor wire 22 is moveable from a first position to a second position in a predetermined way for changing the coil topology. In other words; the device has at least two selectable coil topologies which can be achieved by one and the same conductor wire.

The second topology 27a corresponds to the topology 27b of the second pipe portion 26. The second pipe portion 26 has a longitudinal extension forming a pattern that gives the conductor wire 22 the second topology 27a when being arranged inside the second pipe portion 26. Thus, the second pipe portion 26 forms a pattern corresponding to the winding pattern of the coil 23. The second pipe portion 26 can have a pattern corresponding to a topology of a coil used for charging vehicles, such as a CS coil topology.

Although the first pipe portion and the second pipe portion illustrated herein, each forms a continuous pipe portion with a length corresponding to the conductor wire length, such a pipe portion could comprise two or more separate parts forming an intermittent pipe portion providing the desired pattern. For example, for moving the conductor wire and achieve a pipe portion pattern giving the desired topology, pipe portion parts arranged at the bends may be sufficient.

Accordingly, the first topology can have a plurality of coil windings arranged in a first pattern and the second topology can have the plurality of coil windings arranged in a second pattern different from the first pattern. Thus, the coil topology can be changed by changing the configuration of the winding pattern of the coil 23. The first topology can have a double-D (DD) winding pattern configuration, also called double-D (DD) coil topology, and the second topology can have a circular square (CS) winding pattern configuration, also called circular square (CS) coil topology. Such coil topologies are suitably used in transmitters and receivers for charging vehicles.

By providing various winding patterns, a winding pattern configuration matching the winding pattern configuration of a corresponding coil of a further apparatus can be selected. For example, the winding pattern of a transmitter coil used for charging a vehicle can be selected to match a winding pattern of a receiver coil of the vehicle for achieving efficient charging.

The first topology can also have a plurality of coil windings arranged at a first level and the second topology can have the plurality of coil windings arranged at a second level different from the first level. Thus, the coil topology can be changed by changing the winding pattern level. This means that there is a distance between the coil position in the first level and the coil position in the second level in a direction that is perpendicular to a main extension plane of the coil 23. A Cartesian coordinate system is indicated in FIG. 2A, where the main extension plane of the coil 23 is parallel with the XY-plane and thus the first level and the second level correspond to different positions along the Z-axis. In other words; the distance between the first level and a reference point, in a direction perpendicular to the main extension plane of the coil 23, is different from the distance between the second level and the reference point. Such a reference point can be a fixed point or surface of the device, such as a point or surface of the housing 21 for instance.

By providing various levels for the coil, the position of the coil relative to a corresponding coil of a further apparatus can be varied. For example, the position relative to the floor/ground of a charging station for a transmitter coil used for charging a vehicle, can be varied and adapted to the position of a receiver coil of the vehicle for achieving efficient charging. In such a case, with reference to FIG. 2A, the device is arranged such that the Z-axis is parallel with a vertical direction and the coil is rearrangeable such that various levels can be selected.

The first topology or the second topology can be selected automatically based on the topology type of a receiver coil, which can be sensed, or the first topology or the second topology can be selected by an operator by pushing a button.

Other topologies than DD coil topology and CS coil topology are of course possible, and the conductor wire 22 could be rearrangeable to achieve more than two different topologies. In fact, the conductor wire could be arranged to be rearrangeable such that two or more different winding patterns and/or two or more different levels of the conductor wire can be selected.

Although in the example embodiment illustrated in FIG. 2A, the first pipe portion 24 is arranged in a pattern giving the conductor wire a DD coil topology (25a) and the second pipe portion 26 is arranged in a pattern giving the conductor wire a CS coil topology (27a), pipe portions having other patterns for achieving other coil topologies could also be used.

For facilitating movement of the conductor wire between different topologies, lubricant can be arranged inside the pipe portion for reducing the friction between the conductor wire and the pipe portion. Further, one or more rolls can be arranged inside the pipe portion, preferably at bends of the pipe portion for reducing the friction between the conductor wire and the pipe portion.

Figure 3:
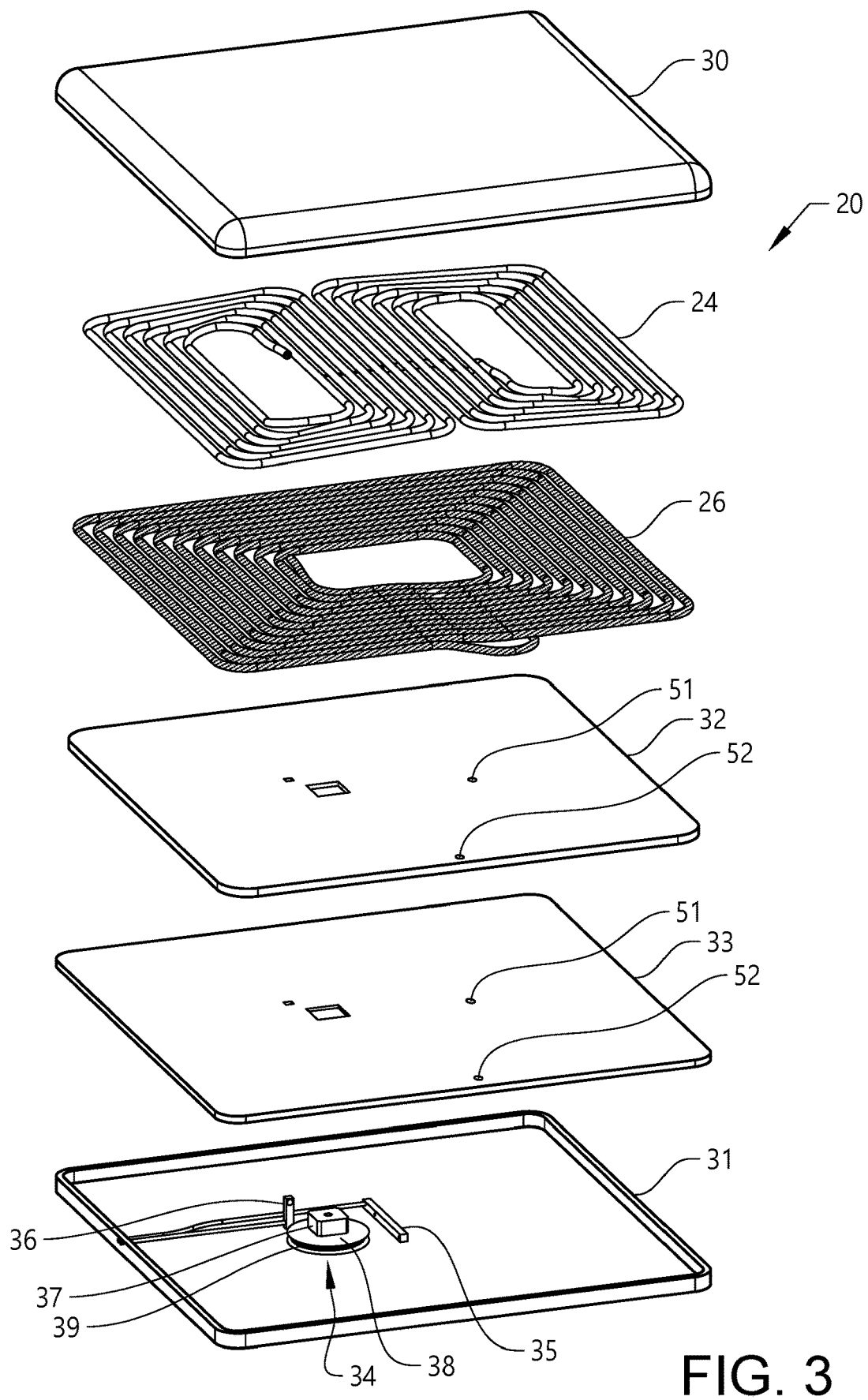
FIG. 3 is an exploded view of the device in FIG. 2A.

FIG. 3 shows an example embodiment of the device 20 in an exploded view. The housing 21 comprises a top cover 30 and a bottom cover 31 shown separated from each other. The top cover 30 and the bottom cover 31 are mechanically connectable to each other for forming the housing 21. The components to be arranged inside the housing 21 are illustrated between the top cover 30 and the bottom cover 31. The first pipe portion 24 and the second pipe portion 26 arranged for providing the first topology and the second topology, respectively, are arranged on top of each other. The first pipe portion 24 and the second pipe portion 26 are preferably made by a non-conductive material, such as plastic or similar.

The conductor wire 22 forming the coil 23 is not shown in FIG. 3 but should be arranged inside the first pipe portion 24 or the second pipe portion 26 as previously described. Although other types of conductor wire could be used, the conductor wire is preferably a sum of many small strands of individually insulated copper wires, a so called Litz wire for instance.

Further, a ferrite plate 32 is arranged below the first pipe portion 24 and the second pipe portion 26. The number of ferrite plates can be varied, and such a ferrite plate may in turn be divided into a plurality of sub ferrite plates and/or be designed in different shapes. The function and design of such a ferrite plate is well known by the person skilled in the art and will not be further described herein.

Between the bottom cover 31 and the ferrite plate 32 a back plate 33 is arranged. The back plate 33 is an insulation plate made by aluminium for instance.

In addition, the device 20 suitably comprises an actuator 34 for moving the conductor wire 22 from the first topology to the second topology, and from the second topology to the first topology. The actuator 34 is arranged for moving the conductor wire 22 in the longitudinal direction of the conductor wire 22. This means that the conductor wire 22 arranged inside the pipe portion can be pushed or preferably pulled through the pipe portion while following the pipe portion configuration. Finally, the device 20 comprises electric contacts 35, 36 for connection of an input power cable and an output cable for connecting an external power source to the conductor wire 22. The actuator can comprise a motor 37, a spool 38 driven by the motor 37 and a non-conductive thread 39 wound on the spool 38 and mechanically connected to the conductor wire 22. The non-conductive thread is also shown in FIGS. 2B and 2C. The actuator 34 will be further described hereinafter with reference to FIG. 5.

Figure 4:
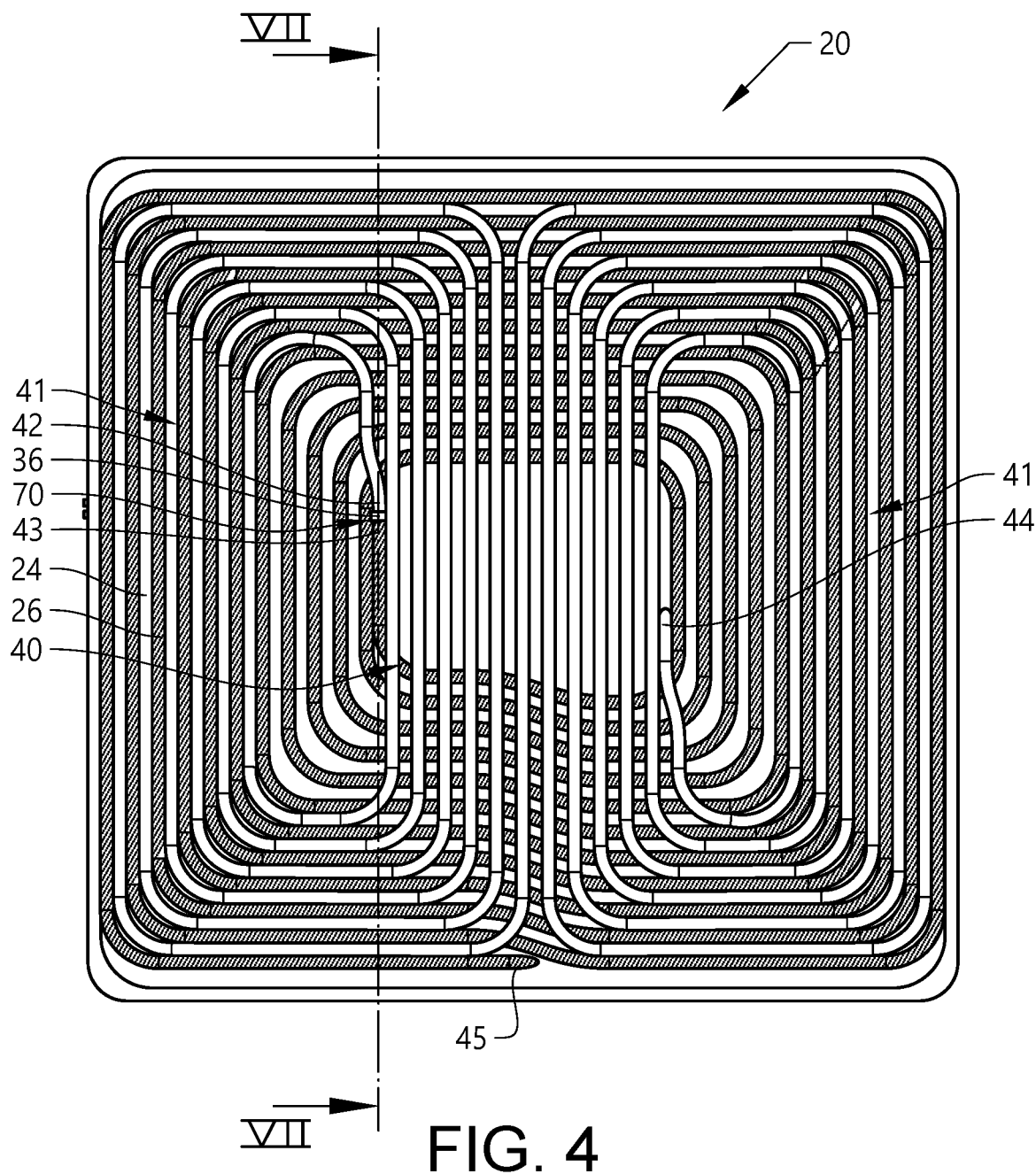
FIG. 4 is a top view of the device in FIG. 2A.

FIG. 4 shows a top view of the device 20 where the top cover has been removed. The first pipe portion 24 is arranged in a pattern giving the conductor wire a DD coil topology and the second pipe portion 26 is arranged in a pattern giving the conductor wire a CS coil topology. In a central part 40 of the housing 21, the first pipe portion 24 is arranged above the second pipe portion 26, and in outer parts 41 of the housing 21 the first pipe portion 24 and the second pipe portion 26 are arranged substantially in the same plane with alternating windings of the first pipe portion 24 and windings of the second pipe portion 26 in the plane.

A first end 42 of the first pipe portion 24 and a first end 43 of the second pipe portion 26 are mechanically connected to each other for forming a continuous pipe portion. A second end 44 of the first pipe portion 24 and a second end 45 of the second pipe portion 26 extend through the ferrite plate 32 and the back plate 33 to a first connection unit arranged between the back plate 33 and the bottom cover 31.

Figure 5:
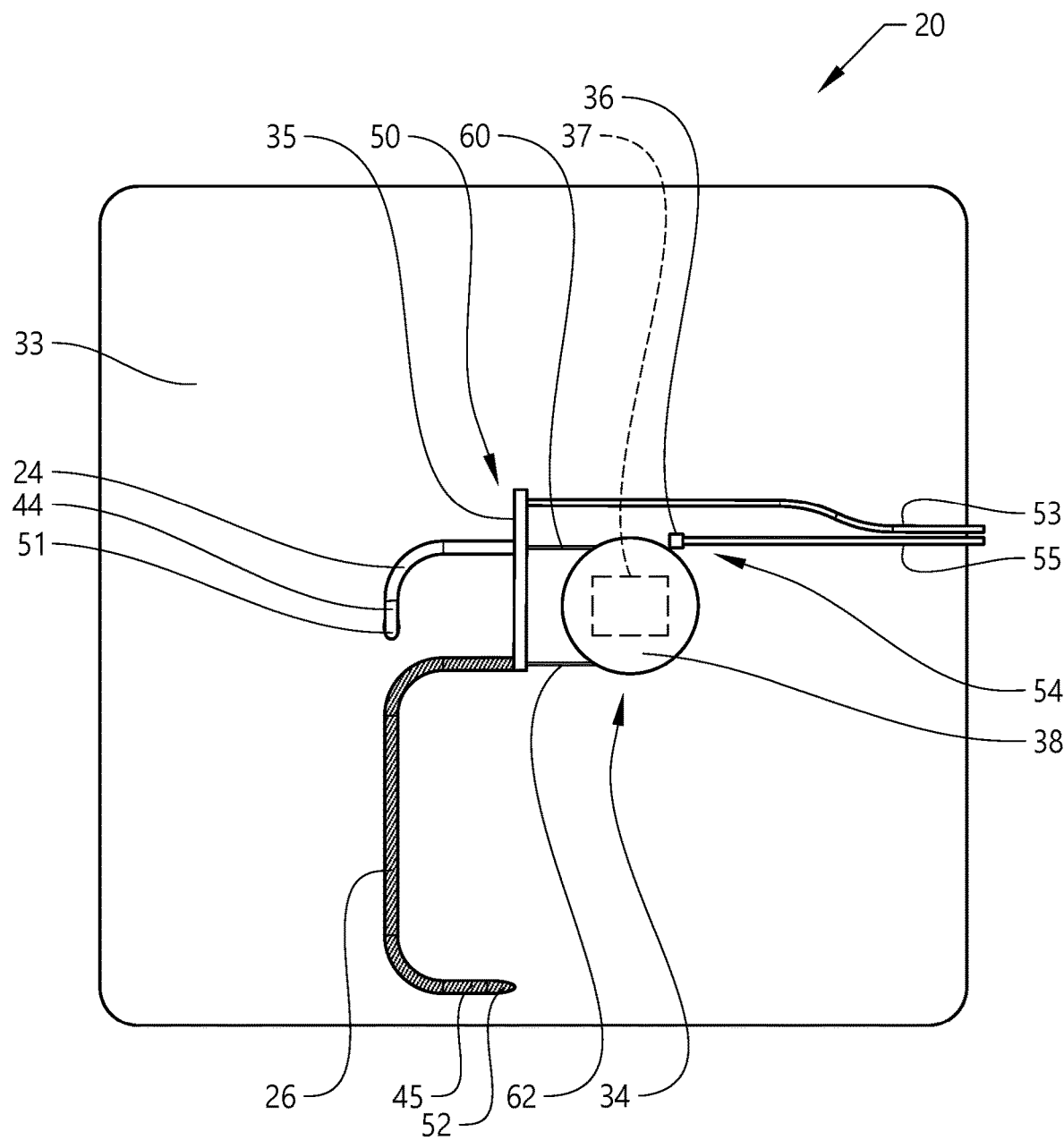
FIG. 5 is a bottom view of the device in FIG. 2A.

FIG. 5 shows a bottom view of the device 20 where the bottom cover has been removed. The second end 44 of the first pipe portion 24 extends from a through hole 51 of the back plate 33 to the first connection unit 50. The second end 45 of the second pipe portion 26 extends from a through hole 52 of the back plate 33 to the first connection unit 50. The first connection unit 50 provides a first electric contact 35 to which a first end of the conductor wire 22 or a second end of the conductor wire 22 can be connected. The first end of the conductor wire 22 is connected to the first electric contact 35 when the conductor wire 22 is arranged in the first pipe portion 24, whereas the second end of the conductor wire 22 is connected to the first electric contact 35 when the conductor wire 22 is arranged in the second pipe portion 26. The first electric contact 35 is in turn connected to a power source by the input power cable 53.

The device 20 also comprises a second connection unit 54 providing a second electric contact 36 to which the first end of the conductor wire 22 or the second end of the conductor wire 22 can be connected. The second connection unit 54 can be arranged at the connection point 70 between the first pipe portion 24 and the second pipe portion 26 for contacting the conductor wire 22 by the second electric contact 36. See FIG. 4. The second connection unit 54 can extend from the pipe portion, for example close to the connection point 70 of the first pipe portion 24 and the second pipe portion 26, and through the ferrite plate 32 and the back plate 33 to a position between the back plate 33 and the bottom cover 31 of the housing 21. Here, the second electric contact 36 can be connected to the output cable 55 in a similar way as the first electric contact 35 is connected to the input power cable 53. See FIGS. 3 and 4 showing the second electric contact 36 at the connection point 70.

The second end of the conductor wire 22 is connected to the second electric contact 36 when the conductor wire 22 is arranged in the first pipe portion 24, whereas the first end of the conductor wire 22 is connected to the second electric contact 36 when the conductor wire 22 is arranged in the second pipe portion 26.

Figure 7:
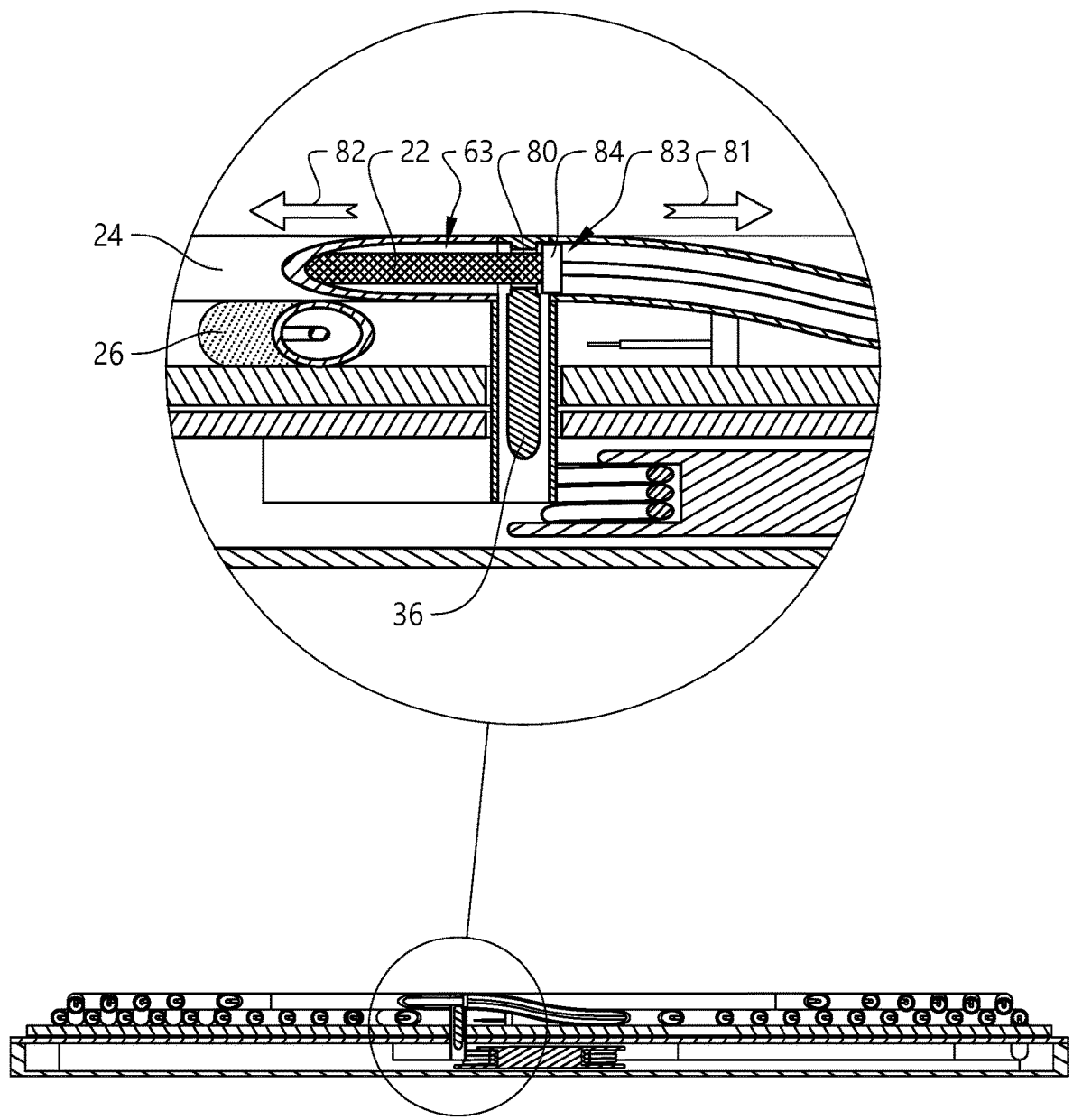
FIG. 7 is a cross-section view taken along the line VII-VII in FIG. 4.

FIG. 7 is a cross-section view taken along the line VII-VII in FIG. 4. The second electric contact 36 can have an opening 80 through which the conductor wire 22 extends which opening 80 enables the conductor wire 22 to be moved relative to the second electric contact 36 in two opposite directions 81, 82. Thus, when the conductor wire 22 is moved from the first topology to the second topology, the conductor wire 22 moves through the opening 80 of the second electric contact 36 from a position where the second end 63 of the conductor wire 22 is connected to the second electric contact 36 to a position where the first end 61 (not shown in FIG. 7) of the conductor wire 22 is connected to the second electric contact 36, and vice versa. The conductor wire 22 can have means 83 at the first end 61 and the second end 63 for preventing the conductor wire 22 from being moved further in the same direction when the first end or second end has reached the second electric contact 36. For example, such a means 83 can be a portion 84 arranged on the conductor wire 22 which portion 84 has a larger size than the opening 80 preventing the portion 84 from passing through the opening 80.

Thus, preferably, the first end of the conductor wire 22 is electrically connected to the first electric contact 35 and the second end of the conductor wire 22 is electrically connected to the second electric contact 36, when the coil 23 has the first topology, and the first end of the conductor wire 22 is electrically connected to the second electric contact 36 and the second end of the conductor wire 22 is electrically connected to the first electric contact 35, when the coil 23 has the second topology. Preferably, the portions 84 arranged at the ends of the conductor wire are used for contacting the second electric contact 36 and the first electric contact 35, respectively.

Figure 6:
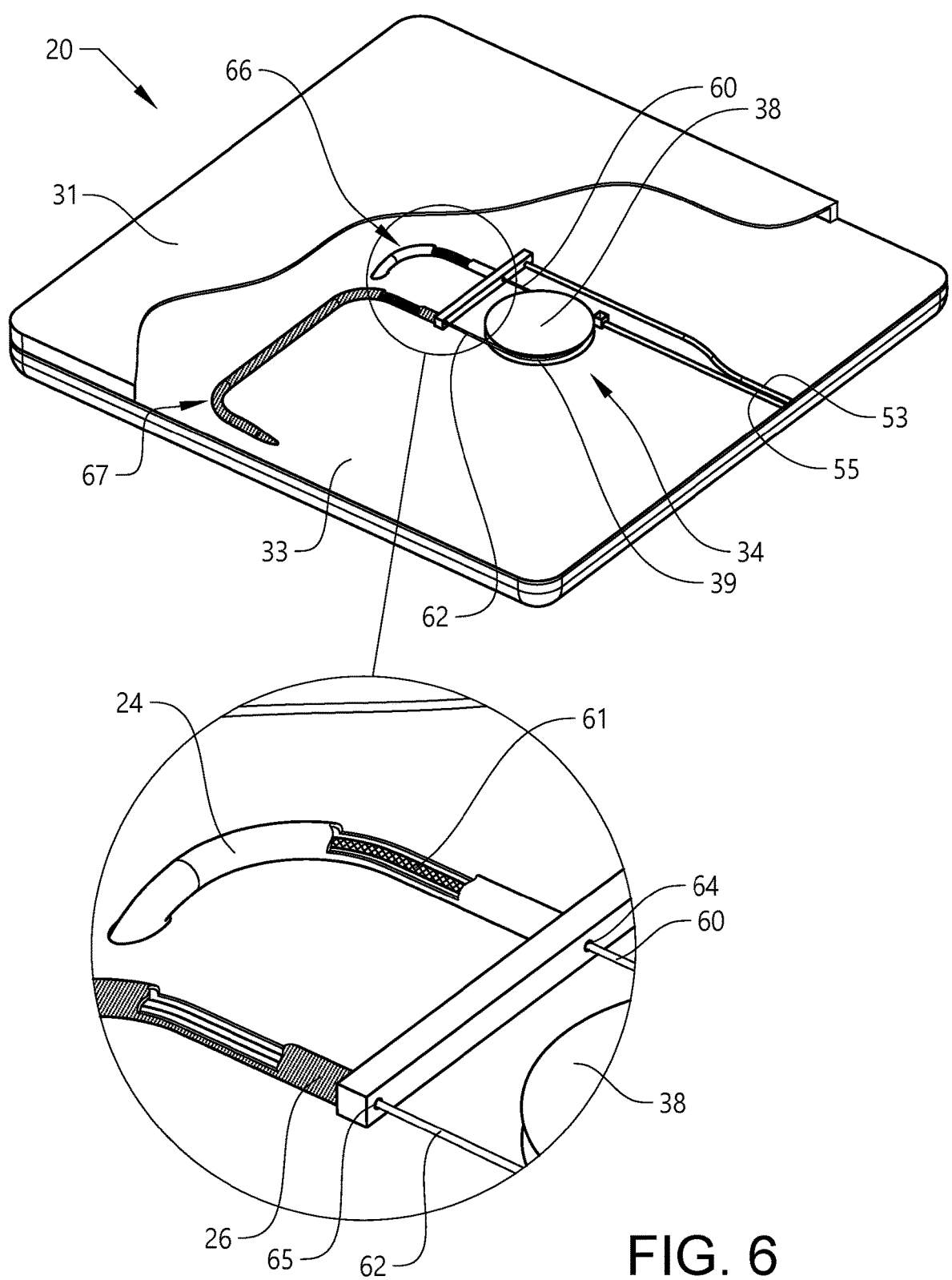
FIG. 6 is a perspective view of the device in FIG. 2A shown with the bottom side up.

FIGS. 5 and 6 show an example of the actuator 34 which is arranged between the back plate 33 and the bottom cover 31 of the housing 21. FIG. 6 is a perspective view of the device 20 shown with the bottom side up. Thus, the device 20 illustrated in FIGS. 5 and 6 is turned upside down relative to the device illustrated in FIGS. 2 and 4. The bottom cover 31 of the housing 21 is partly cut in FIG. 6 and removed in FIG. 5 for illustrating the actuator 34.

The actuator 34 comprises the motor 37, see also FIG. 3, the spool 38 driven by the motor 37 and the non-conductive thread 39 wound on the spool 38. The motor 37 can be arranged in the back plate 33 and attached with any suitable means known by the skilled in the art. The thread 39 and the conductor wire 22 are mechanically connected to each other. The motor 37 can be an electric stepping motor driving the spool 38. The motor 37 can be controlled by a control unit. As previously described, the conductor wire 22 is arranged inside the pipe portion and the actuator 34 is arranged for moving the conductor wire 22 from the first pipe portion 24 to the second pipe portion 26, and vice versa. The actuator 34 is arranged for pulling the conductor wire 22 in the longitudinal direction of the conductor wire 22 by driving the spool 38. When the spool 38 is rotated, the thread 39 will wound up on the spool 38 and pull the conductor wire 22. This means that the conductor wire 22 can be pulled through the pipe portion step by step while following the pipe portion configuration.

In the example embodiment illustrated in FIGS. 5 and 6, the thread 39 on the spool 38 has a first end 60 mechanically connected to a first end 61 of the conductor wire 22 and a second end 62 mechanically connected to a second end of the conductor wire 22. The second end of the conductor wire is not shown here since the first topology is illustrated where the second end of the conductor wire is connected to the second electric contact of the second connection unit.

The first end 60 of the thread 39 can suitably be moved through a first opening 64 of the first connection unit 50, and the second end 62 of the tread 39 can suitably be moved through a second opening 65 of the first connection unit 50. The first end 60 of the thread is arranged to be wound up on the spool 38 and the second end 62 of the thread is arranged to be unwound from the spool 38, when the conductor wire 22 is moved from the second topology to the first topology. Further, the first end 60 of the thread is arranged to be unwound from the spool 38 and the second end 62 of the thread is arranged to be wound up on the spool 38, when the conductor wire 22 is moved from the first topology to the second topology.

As further illustrated in FIGS. 5 and 6, the first pipe portion 24 and the second pipe portion 26 each has a part 66, 67 extending in the space between the back plate 33 and the bottom cover 31. The back plate 33 constitutes a shield and the conductor wire 22 arranged in these parts 66, 67 of the first and second pipe portions is shielded by the back plate 33. Thus, the length of the conductor wire 22 shielded by the shield 33 is variable by movement or rearrangement of the conductor wire 22. These shielded conductor wire parts will not contribute to the magnetic field used for charging.

This can be utilized for allowing different effective conductor wire lengths for different topologies for one and the same conductor wire length. In the example embodiment illustrated, the first topology (DD coil topology) requires a somewhat longer conductor wire length than the second topology (CS coil topology). In other words; a part of the conductor wire 22 may constitute an excess of conductor wire for one of the first coil topology and the second coil topology due to different conductor wire lengths required for the first topology and the second topology. This conductor wire part can be shielded by the shield. The excess of conductor wire 22 when the shorter CS coil topology is used can be arranged in the part 67 of the second pipe portion 26 that is shielded. For this reason, in the illustrated example embodiment in FIGS. 5 and 6, the part 67 of the second pipe portion 26 arranged on the shielded side of the back plate 33 is longer than the part 66 of the first pipe portion 24 arranged on the shielded side of the back plate 33.

In addition to move the conductor wire 22 from one topology to another topology, the actuator 34 could be used for fine-tuning the position of the conductor wire for optimizing the power transfer. Such adjustment of the conductor wire can comprise adjustment of the position of the conductor wire and/or the effective length (non-shielded length) of the conductor wire 22.

It is to be understood that the present invention is not limited to the embodiments described above and illustrated in the drawings; rather, the skilled person will recognize that many changes and modifications may be made within the scope of the appended claims.

What is claimed is:

1. A device for a wireless power transfer system, the device comprising a housing and a conductor wire forming a coil arranged in the housing, the coil having a first topology, wherein the conductor wire is rearrangeable such that the coil is given a second topology instead of the first topology, the first topology and the second topology being different from each other, wherein the device comprises an actuator for moving the conductor wire from the first topology to the second topology, and from the second topology to the first topology.

2. A device according to claim 1, wherein the first topology has a plurality of coil windings arranged in a first pattern and the second topology has the plurality of coil windings arranged in a second pattern different from the first pattern.

3. A device according to claim 1, wherein the first topology has a plurality of coil windings arranged at a first level and the second topology has the plurality of coil windings arranged at a second level different from the first level.

4. A device according to claim 1, wherein the actuator is arranged for moving the conductor wire in the longitudinal direction of the conductor wire.

5. A device according to claim 1, wherein the actuator comprises a motor, a spool driven by the motor and a non-conductive thread wound on the spool and mechanically connected to the conductor wire.

6. A device according to claim 1, the device comprises a first pipe portion for receiving and accommodating the conductor wire inside the first pipe portion, the first pipe portion having a longitudinal extension forming a pattern that gives the conductor wire the first topology when being arranged inside the first pipe portion.

7. A device according to claim 1, wherein the device comprises a second pipe portion for receiving and accommodating the conductor wire inside the second pipe portion, the second pipe portion having a longitudinal extension forming a pattern that gives the conductor wire the second topology when being arranged inside the second pipe portion.

8. A device according to claim 1, wherein the device has a shield, the length of the conductor wire shielded by the shield being variable by movement of the conductor wire.

9. A device according to claim 1, wherein the device has a first electric contact and a second electric contact, a first end of the conductor wire being electrically connected to the first electric contact and a second end of the conductor wire being electrically connected to the second electric contact, when the coil has the first topology, and the first end of the conductor wire being electrically connected to the second electric contact and the second end of the conductor wire being electrically connected to the first electric contact, when the coil has the second topology.

10. A device according to claim 9, wherein the second electric contact has an opening through which the conductor wire extends, the conductor wire being moveable relative to the second electric contact in two opposite directions.

11. A device according to claim 1, wherein at least one of the first topology and the second topology is arranged for wireless power transfer for charging a further apparatus or being charged by a further apparatus.

12. A device according to claim 11, wherein the first topology and the second topology are arranged for wireless power transfer for charging the further apparatus or being charged by the further apparatus, the first topology being a double-D coil topology and the second topology being a circular square coil topology, or the first topology being a circular square coil topology and the second topology being a double-D coil topology.

13. A transmitter for a wireless power transfer system, wherein the transmitter comprises a device according to claim 1.

14. A wireless power transfer system for charging a vehicle, wherein the system comprises a device according to claim 1.

* * * * *